United States Patent
Hayashi et al.

[11] Patent Number: 6,157,162
[45] Date of Patent: Dec. 5, 2000

[54] BATTERY CHARGING APPARATUS FOR ELECTRIC VEHICLES

[75] Inventors: Kiyotaka Hayashi; Kenji Uchibori; Akiyoshi Yamamoto, all of Utsunomiya, Japan

[73] Assignee: Honda Giken Kogyo Kabushiki Kaisha, Tokyo, Japan

[21] Appl. No.: 09/391,593

[22] Filed: Sep. 8, 1999

[30] Foreign Application Priority Data

Sep. 9, 1998 [JP] Japan ................... 10-255719

[51] Int. Cl.⁷ .................................................. H02J 7/00
[52] U.S. Cl. ............................................................ 320/104
[58] Field of Search ................... 320/108, 109, 320/104

[56] References Cited

U.S. PATENT DOCUMENTS

| | | | |
|---|---|---|---|
| Re. 36,225 | 6/1999 | Harris | 320/104 |
| 5,462,439 | 10/1995 | Keith | 320/109 |
| 5,498,948 | 3/1996 | Bruni et al. | 320/108 |
| 5,523,666 | 6/1996 | Hoelzl et al. | 320/109 |
| 5,538,809 | 7/1996 | Bittihn et al. | 320/109 |
| 5,606,237 | 2/1997 | Biasotti et al. | 320/108 |
| 5,661,391 | 8/1997 | Hoelzl et al. | 320/109 |
| 5,703,461 | 12/1997 | Minoshima et al. | 320/108 |
| 5,711,558 | 1/1998 | Woody | 292/335 |
| 5,714,864 | 2/1998 | Rose et al. | 320/109 |
| 5,850,135 | 12/1998 | Kuki et al. | 320/108 |
| 5,909,100 | 6/1999 | Watanabe et al. | 320/108 |
| 6,014,597 | 1/2000 | Kochanneck | 320/109 |

FOREIGN PATENT DOCUMENTS

| | | |
|---|---|---|
| 6-14408 | 1/1994 | Japan . |
| 9-182212 | 7/1997 | Japan . |

OTHER PUBLICATIONS

U.S. application No. 09/391,512; filed Sep. 8, 1999; By: Uchibori et al Title: Charging Lid Opening and Closing Device for Electric Vehicle.

*Primary Examiner*—Shawn Riley
*Assistant Examiner*—Pia Tibbits
*Attorney, Agent, or Firm*—Arent, Fox, Kintner, Plotkin & Kahn PLLC

[57] ABSTRACT

When a feeding coupler is pressed by a receiving coupler, the feeding coupler is disengaged by a first engaging member of a fixing mechanism so as to be displaceable along an electric vehicle, and also disengaged by a second engaging member of the fixing mechanism so as to be angularly movable with respect to a displacing mechanism. The feeding mechanism then engages the receiving coupler, and starts charging the battery on the electric vehicle.

6 Claims, 17 Drawing Sheets

6,157,162

BATTERY CHARGING APPARATUS FOR ELECTRIC VEHICLES

BACKGROUND OF THE INVENTION

1. Field of the Invention

The present invention relates to a battery charging apparatus for supplying electric energy to the battery of a battery-powered electric vehicle through a receiving coupler mounted on the electric vehicle.

2. Description of the Related Art

Recent years have seen progress in the development of electric vehicles as means of transportation for reducing the rate of consumption of existing fossil fuels and avoiding possible environmental pollution. Electric vehicles are powered by electric energy stored in and supplied from batteries mounted thereon. The battery on an electric vehicle needs to be charged with electric energy from an external source from time to time. For supplying electric energy to the battery, the electric vehicle has a receiving coupler that can be fitted over an energy supplying coupler of an electric energy supply station.

If, when the electric vehicle is moved to the electric energy supply station, the energy supplying coupler can automatically engage the receiving coupler and start automatically charging the battery through the receiving coupler, then the burden on attendants at the electric energy supply station can be minimized.

One battery charging apparatus which is capable of such automatic battery charging operation is disclosed in Japanese laid-open patent publication No. 6-14408, for example. According to the disclosed battery charging apparatus, the two-dimensional position and attitude of an electric vehicle with respect to a battery charging apparatus are detected by a position detector, and the feeding coupler of the battery charging apparatus is displaced on the basis of the detected two-dimensional position and attitude, so that the feeding coupler can be connected to the receiving coupler.

Japanese laid-open patent publication No. 9-182212 discloses another battery charging apparatus which has a position detector disposed so as to face the front side of an electric vehicle, for detecting a lateral position of the electric vehicle. The feeding coupler of the battery charging apparatus is displaced on the basis of the detected position, so that the feeding coupler can be connected to the receiving coupler.

According to the above conventional battery charging apparatus, however, since the coupling accuracy with which the feeding coupler is connected to the receiving coupler depends on only the position detector of the battery charging apparatus, if the coupling accuracy is to be increased, then not only the positional detector needs to be highly accurate, but also the feeding coupler has to be displaced by a highly accurate mechanism. As a consequence, the conventional battery charging apparatus are necessarily highly expensive to manufacture.

Furthermore, because the couplers would tend to be damaged if the electric vehicle happened to move while the battery is being charged, it is necessary for the conventional battery charging apparatus to perform a control process for detecting the position and attitude of the electric vehicle at all times during the charging of the battery, and effecting positional correction of the electric vehicle. Such a control process may be dispensed with by making the feeding coupler angularly movable to accommodate accidental movement of the electric vehicle. However, when the feeding coupler swings in the process of being coupled to the receiving coupler, the feeding coupler and the receiving coupler may not be able to achieve a desired exact coupling therebetween, and may possibly be damaged.

SUMMARY OF THE INVENTION

It is therefore a general object of the present invention to provide a battery charging apparatus which is of a relatively simple structure capable of connecting a feeding coupler highly accurately to a receiving coupler on an electric vehicle, and continuing to charge the battery on the electric vehicle without being affected by positional changes of the electric vehicle while the feeding coupler and the receiving coupler are being coupled to each other.

Another object of the present invention is to provide a battery charging apparatus which is free of excessive loads on a feeding coupler and a receiving coupler when they are connected to each other, and hence prevents the feeding coupler and the receiving coupler from being damaged.

Still object of the present invention is to provide a battery charging apparatus which is of a relatively simple structure capable of connecting a feeding coupler and a receiving coupler to each other.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
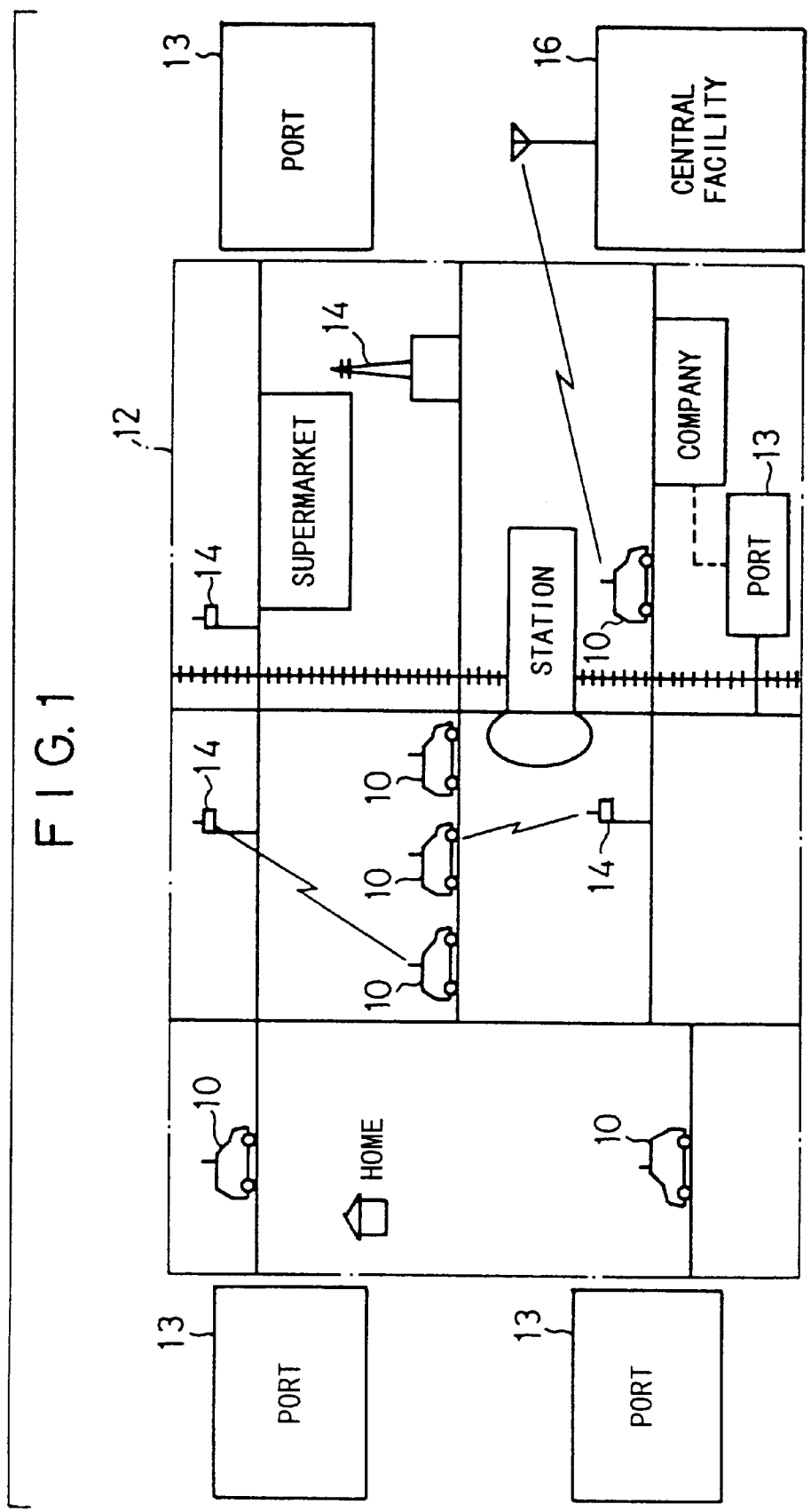
FIG. 1 is a schematic plan view of an electric vehicle sharing system which incorporates the principles of the present invention.

FIG. 1 schematically shows an electric vehicle sharing system which incorporates the principles of the present invention.

The electric vehicle sharing system shown in FIG. 1 is a system for allowing a plurality of users to share a plurality of electric vehicles 10. The electric vehicle sharing system covers an area 12 where the users can drive the available electric vehicles 10. The area 12 is combined with a plurality of ports 13 where a plurality of electric vehicles 10 can be parked. A user, i.e., a driver, rents an electric vehicle 10 from a port 13 near the driver's house or company, drives the electric vehicle 10 from the port 13 to a nearby station or supermarket, for example, accomplishes whatever the purpose may be, and thereafter returns the electric vehicle 10 to a nearby port 13. The area 12 contains a plurality of communication means 14 for transmitting and receiving information relative to the status of usage of the electric vehicles 10 by way of suitable communications. The received information is sent from the communication means 14 to a central facility 16 of the electric vehicle sharing system.

Figure 2:
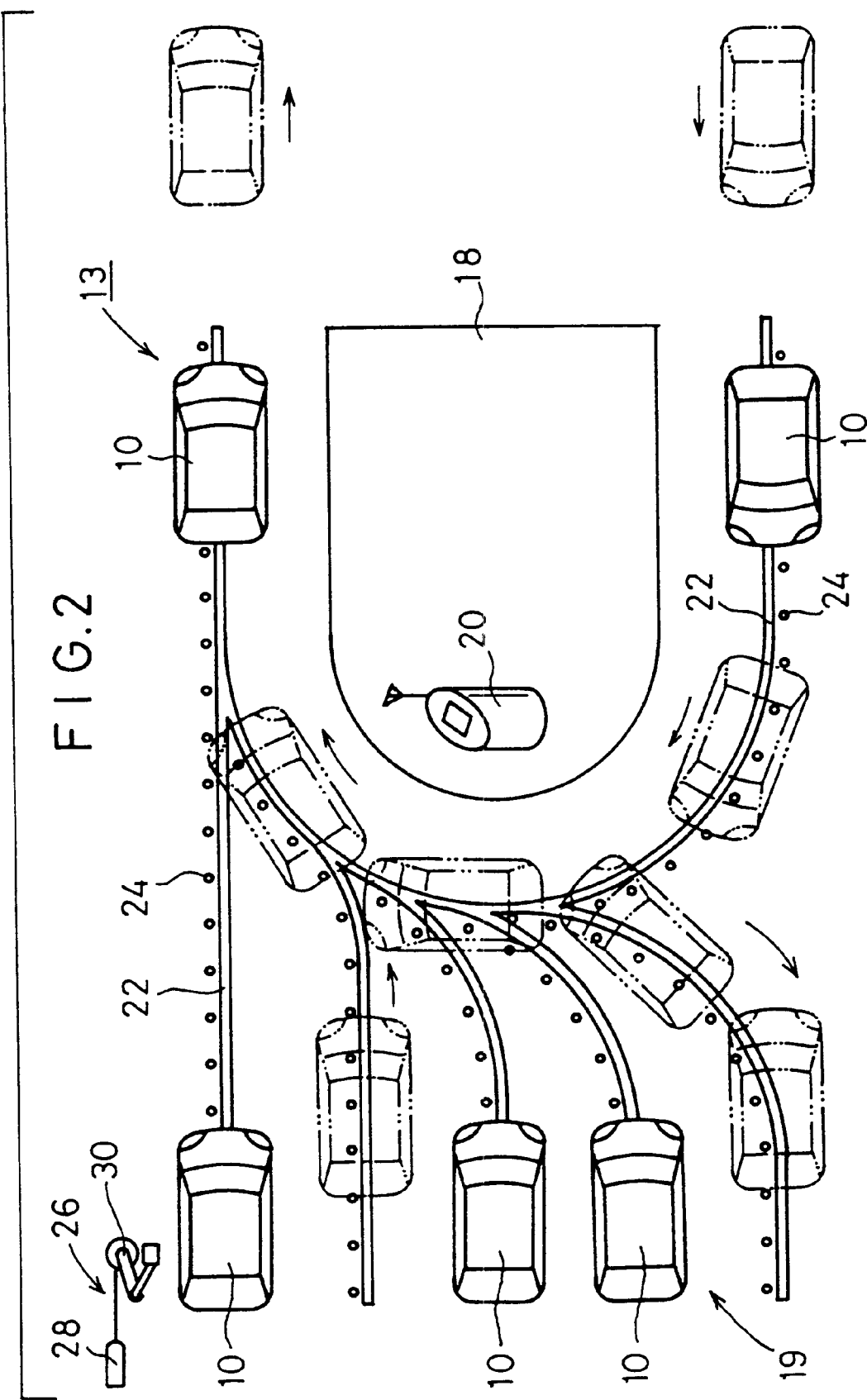
FIG. 2 is a schematic plan view of a port for storing electric vehicles, of the electric vehicle sharing system.

FIG. 2 schematically shows in plan structural details of each of the ports 13. As shown in FIG. 2, the port 13 comprises a platform 18 where users rent and return electric vehicles 10, and a plurality of parking areas 19 for pooling a plurality of electric vehicles 10. The platform 18 has a port terminal control unit 20 for performing vehicle renting and returning processes. Specifically, a user rents a desired electric vehicle 10 or returns a used electric vehicle 10, using an IC (Integrated Circuit) card storing usage information, etc., at the port terminal control unit 20.

Induction cables 22 and magnetic nails 24 are embedded in each of the ports 13 along routes between the platform 18 and the parking areas 19, for automatically driving the electric vehicles 10. One of the parking areas 19 is associated with a battery charging apparatus 26 for charging the battery on an electric vehicle 10 that is parked in the parking area 19.

Figure 3:
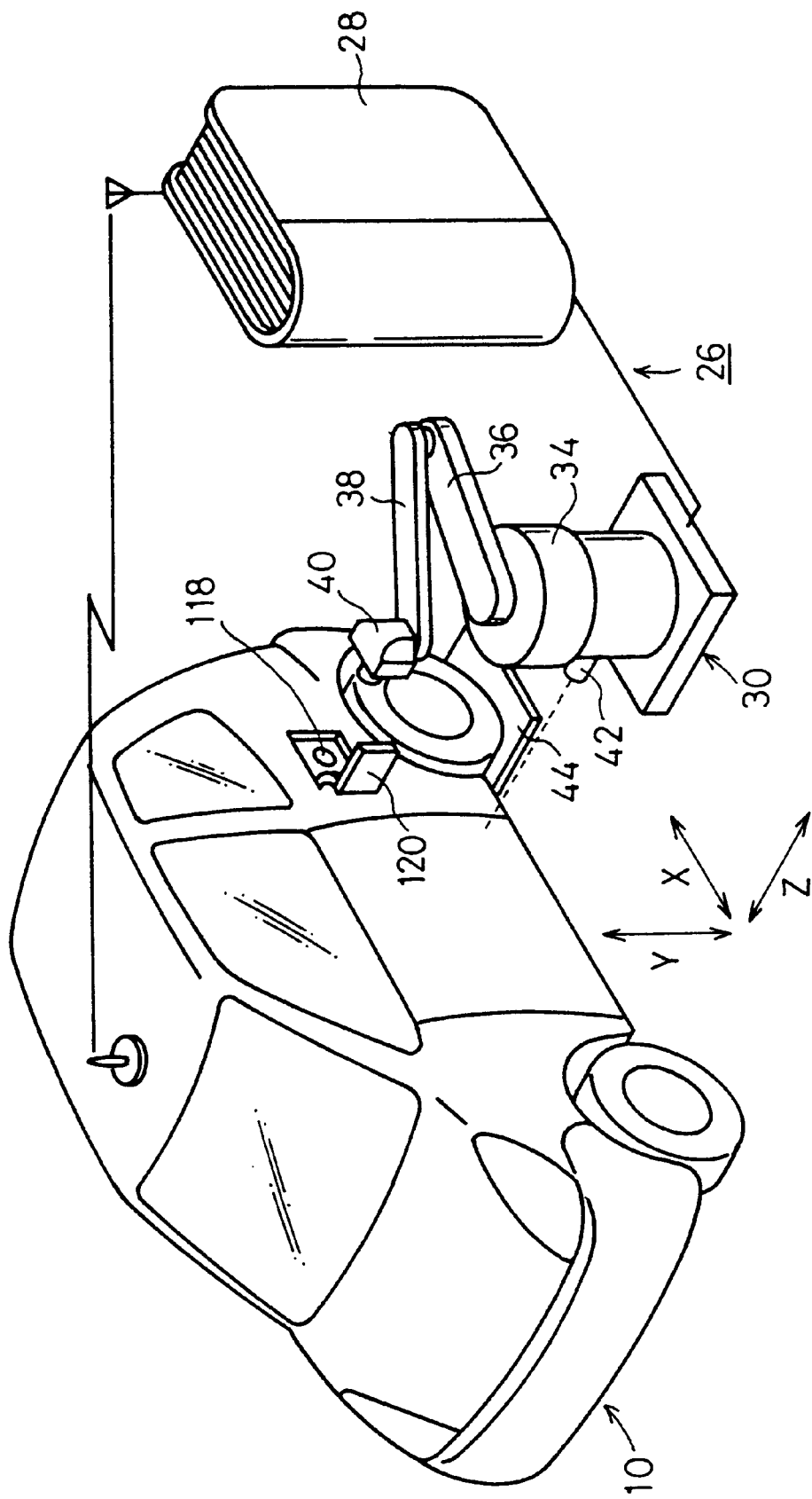
FIG. 3 is a perspective view of an electric vehicle and a battery charging apparatus in a charging port.
Figure 4:
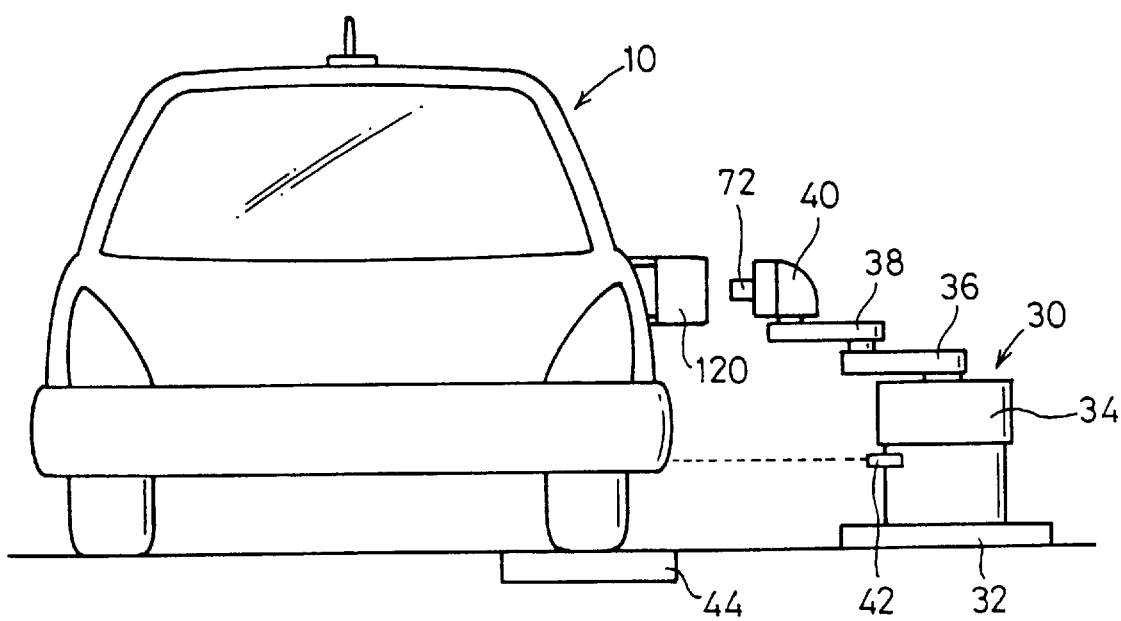
FIG. 4 is an elevational view of the electric vehicle and the battery charging apparatus in the charging port.

FIGS. 3 and 4 show the battery charging apparatus 26 and an electric vehicle 10 parked in the parking area 19 which is equipped with the battery charging apparatus 26. The battery charging apparatus 26 comprises a charger 28 for supplying electric energy based on a charging command signal from the electric vehicle 10 and stopping the supply of electric energy based on a charging completion signal from the electric vehicle 10, and a battery charging robot 30 connected to the charger 28 for automatically charging the battery on the electric vehicle 10.

The battery charging robot 30, as an example of a displacement mechanism, comprises a robot body 34 mounted on a base 32, a first arm 36 having an end pivotally supported on the robot body 34, a second arm 38 having an end pivotally supported on the other end of the first arm 36, and a feeding coupler 40 angularly movably supported on the other end of the second arm 38. The robot body 34 is vertically movable along a Y-axis, which is perpendicular to other horizontal X- and Z-axes, and the first arm 36 and the second arm 38 are swingable about respective axes on the robot body 34 and the first arm 36. Therefore, the feeding coupler 40 angularly movably supported on the end of the second arm 38 can be displaced three-dimensionally along X-, Y-, and Z-axes.

An ultrasonic sensor 42 for detecting a distance from a receiving coupler 118 of the electric vehicle 10 along the Z-axis is mounted on the base 32 of the battery charging robot 30. The parking area 19 also has a tire tread force sensor 44 for detecting the position of the electric vehicle 10 along the X- and Z-axes based on the placement of a rear wheel of the electric vehicle 10 on the tire tread force sensor 44. The tire tread force sensor 44 may be replaced with a CCD camera or the like for detecting the positions of the electric vehicle 10 along the X- and Z-axes.

FIGS. 5 through 8 show structural details of the feeding coupler 40 of the battery charging robot 30. The feeding coupler 40 is mounted on the end of the second arm 38 by a first bracket 46. To the first bracket 46, there is coupled a second bracket 52 by two pins 48, 50 for displacement along the X-axis, i.e., directions normal to the sheets of FIGS. 5 and 6. The second bracket 52 has an integral sleeve 53 extending horizontally and including an intermediate portion which has a prismatic outer shape. A shaft 54 is axially slidably inserted in the sleeve 53. First and second brackets 46, 52, pins 48, 58, sleeve 53 and shaft 54 form an embodiment of a fixing mechanism. The sleeve 53 has an open end positioned remotely from the first bracket 46 and shaped into a skirt 56 having a circular outer contour.

A stop pin 60 is coupled by a plate 58 to an end of the shaft 54 which passes through the second bracket 52. When the stop pin 60 engages in a hole 62 defined in the first bracket 46, the feeding coupler 40 is prevented from being displaced along the X-axis. A limit switch 63 for detecting axial displacement of the shaft 54 is disposed near the end of the shaft 54 which is close to the first bracket 46. A ball 64 is mounted on the other end of the shaft 54, with a collar 66 mounted on the shaft 54 against the ball 64. A helical spring 68 is disposed around the shaft 54 between the skirt 56 and the collar 66.

The feeding coupler 40 has a coupler body 72 angularly movably supported on the ball 64 on the end of the shaft 54 by a bearing 70. The coupler body 72 comprises a bracket 73 supporting the bearing 70, a core 74 joined to the bracket 73, and a feeding coil 76 wound around a block of the core 74 which projects toward the electric vehicle 10. The bracket 73 has a hollow cylindrical central member which holds therein a doughnut-shaped stop ring 78 engaging the skirt 56 of the second bracket 52. To the bracket 73, there is connected a holder 75 which holds therein four springs or resilient members 80, 82, 84, 86 extending radially and angularly positioned at equal angular intervals. This is one embodiment of a support mechanism. The springs 80, 82, 84, 86 have respective radially inner ends held against respective outer surfaces of the intermediate portion of the sleeve 53 which has the prismatic outer shape.

The feeding coupler 40 also has a casing 88 surrounding the components thereof. Three locking hooks 92 are angularly movably mounted by shafts 90 on an inner surface of the casing 88 near the electric vehicle 10. The locking hooks 92 are held in locking engagement with the electric vehicle 10 when the battery on the electric vehicle 10 is charged by the battery charging robot 30. The locking hooks 92, which are angularly movable about the shafts 90, are normally urged in a direction to keep locking engagement with the electric vehicle 10 by springs 94 acting between the bracket 73 and ends of the locking hooks 92. The feeding coupler 40 has, on its surface facing the electric vehicle 10, a pair of light-emitting and -detecting elements 96 for confirming the position of the electric vehicle 10 with respect to the battery charging robot 30, and a pair of light-emitting and detecting elements 98 for exchanging various signals with respect to the charging of the battery, e.g., receiving a charging command signal and a charging completion signal from the electric vehicle 10.

Figure 9:
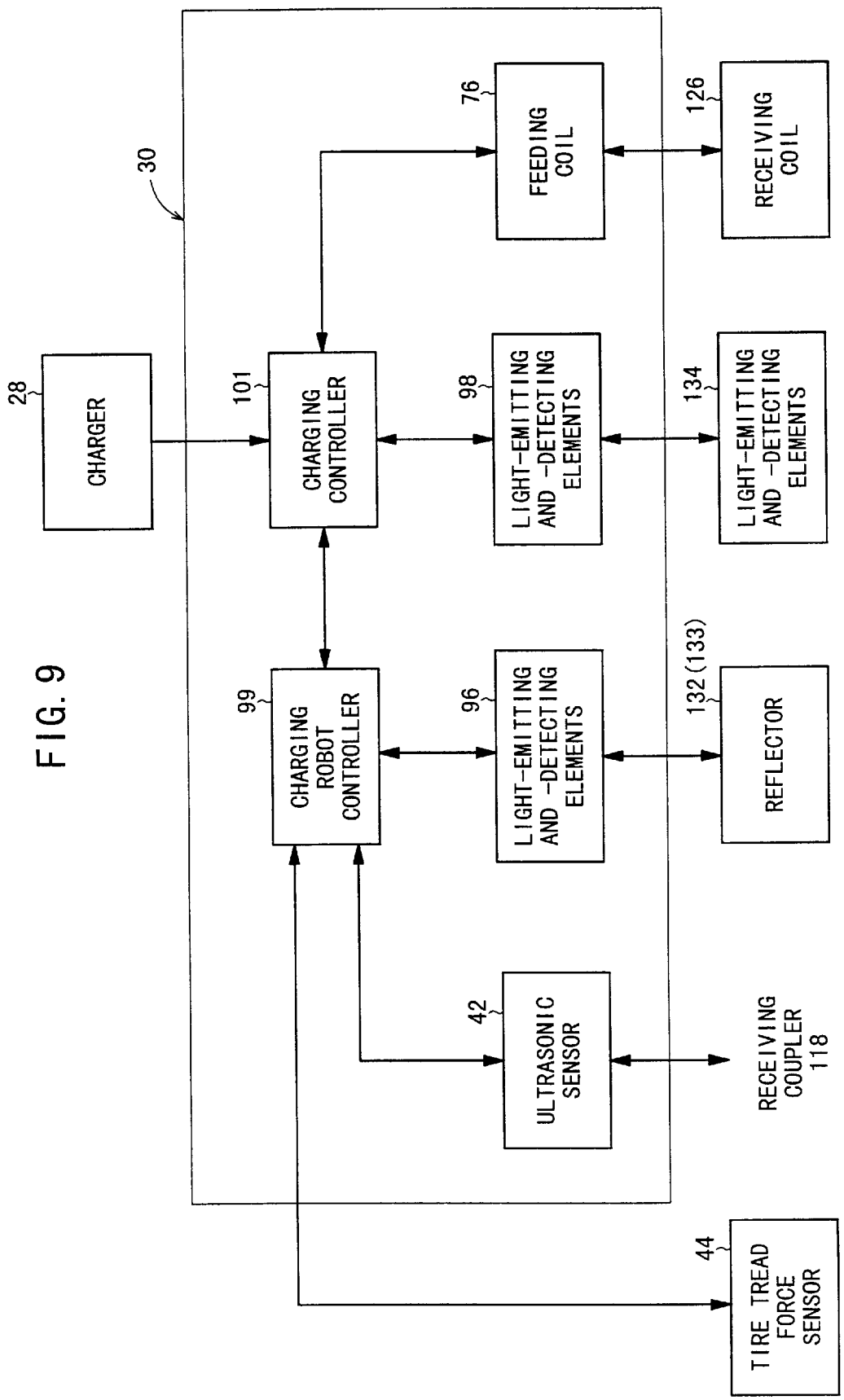
FIG. 9 is a block diagram of an electric system of the battery charging robot.

FIG. 9 shows an electric system, including a control circuit, of the battery charging robot 30. The control circuit has a charging robot controller 99 for controlling operation of the battery charging robot 30, and a charging controller 101 for controlling the charging of the battery based on control signals from the electric vehicle 10. The ultrasonic sensor 42, the tire tread force sensor 44, and the light-emitting and -detecting elements 96 are connected to the charging robot controller 99 for controlling operation of the robot body 34, the first arm 36, and the second arm 38. The charger 28, the charging coil 76, and the light-emitting and -detecting elements 98 are connected to the charging controller 101.

Figure 10:
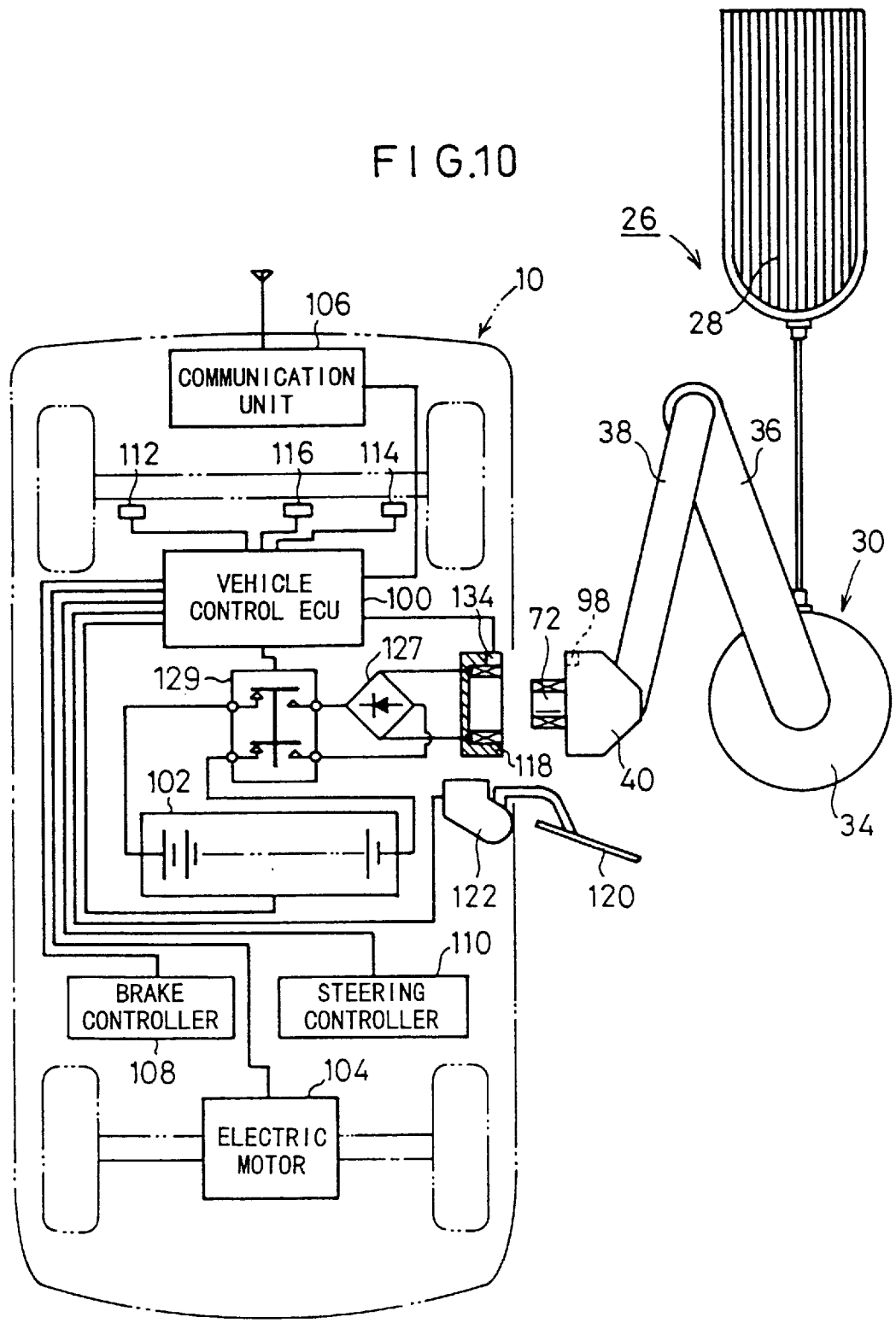
FIG. 10 is a block diagram of an electric system of the electric vehicle.

The electric vehicle 10 that can automatically be charged by the battery charging apparatus 26 is constructed as shown in FIG. 10. As shown in FIG. 10, the electric vehicle 10 comprises a vehicle control ECU 100 for controlling entire operation of the electric vehicle 10 including vehicle driving operation and battery charging operation, a battery 102 for storing electric energy for propelling the electric vehicle 10, and an electric motor 104 for propelling the electric vehicle 10 based on the electric energy supplied from the battery 102. To the vehicle control ECU 100, there are connected a communication unit 106 for performing communication with an external circuit, a brake controller 108 and a steering controller 110 for automatically driving the electric vehicle 10, a pair of sensors 112, 114 for detecting the induction cables 22 embedded in the port 13 (see FIG. 2), and a sensor 116 for detecting the magnetic nails 24 embedded in the port 13.

The sensors 112, 114 serve to detect a magnetic field generated by an alternating current flowing through an induction cable 22 (see FIG. 2), and are laterally spaced along the rear axle of the electric vehicle 10. When the electric vehicle 10 runs along and over an induction cable 22, the sensors 112, 114 produce identical output signals. When the electric vehicle 10 is laterally displaced, one of the sensors 112, 114 produces an output signal greater than the output signal produced by the other of the sensors 112, 114, detecting that the electric vehicle 10 does not run properly along a desired route.

The sensor 116 serves to detect a magnetic field generated by magnets (magnetic nails 24) embedded along a route. The sensor 116 generates an output signal the instant the electric vehicle 10 passes over a magnetic nail 24. Inasmuch as the magnetic nails 24 are displaced a certain distance to the right or left from the induction cables 22, as shown in FIG. 2, the sensor 116 is also displaced laterally from the longitudinal central axis of the electric vehicle 10, as shown in FIG. 10.

The induction cables 22 only have a function to detect when the electric vehicle 10 is laterally displaced off the route. However, the magnetic nails 24 have a function to accurately detect a position of the electric vehicle 10 in its direction of travel, e.g., a position where the electric vehicle 10 stops. The magnetic nails 24 are also used in an auxiliary manner in the case where a route defined by an induction cable 22 is abruptly curved.

Since the sensors 112, 114, 116 serve to detect a magnetic field, they should preferably be installed on the electric vehicle 10 in positions away from magnetic bodies in order to avoid magnetic disturbance. For example, it is preferable to employ attachment members of synthetic resin for attaching the sensors 112, 114, 116 in position. Moreover, because the electric vehicle 10 suffers different radii of curvature of paths traced by outer wheels when it makes a turn, the sensors 112, 114, 116 are positioned along the axle of the rear wheels, rather than the steerable wheels (front wheels), and the electric vehicle 10 is controlled with the axle of the rear wheels as a target for the route, for thereby increasing the accuracy with which the electric vehicle 10 is to follow a desired trajectory when automatically driven.

Figure 11:
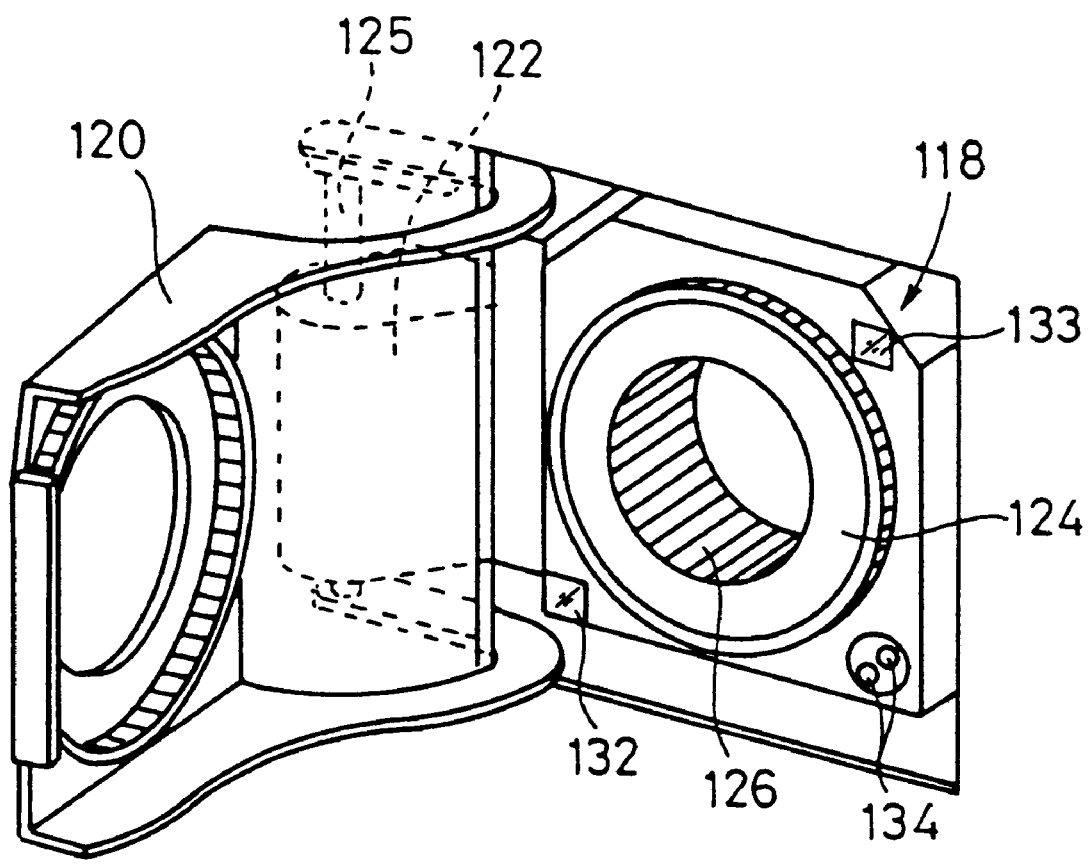
FIG. 11 is a perspective view of a receiving coupler and a charging lid of the electric vehicle.

The electric vehicle 10 has a receiving coupler 118 for charging the battery 102 with the battery charging apparatus 26, and a charging lid opening and closing device 122 for opening and closing a charging lid 120 which covers the receiving coupler 118. As sown in FIG. 11, the receiving coupler 118 comprises a receiving coil 126 wound around a core 124 and connected to the battery 102 through a rectifier 127 and a contactor 129 (see FIG. 10). The core 124 has reflectors 132, 133 for reflecting a light signal from the light-emitting and -detecting elements 96 on the core 74 of the feeding coupler 40, and light-emitting and -detecting elements 134 for sending a light signal to and receiving a light signal from the light-emitting and -detecting elements 98.

Figure 12:
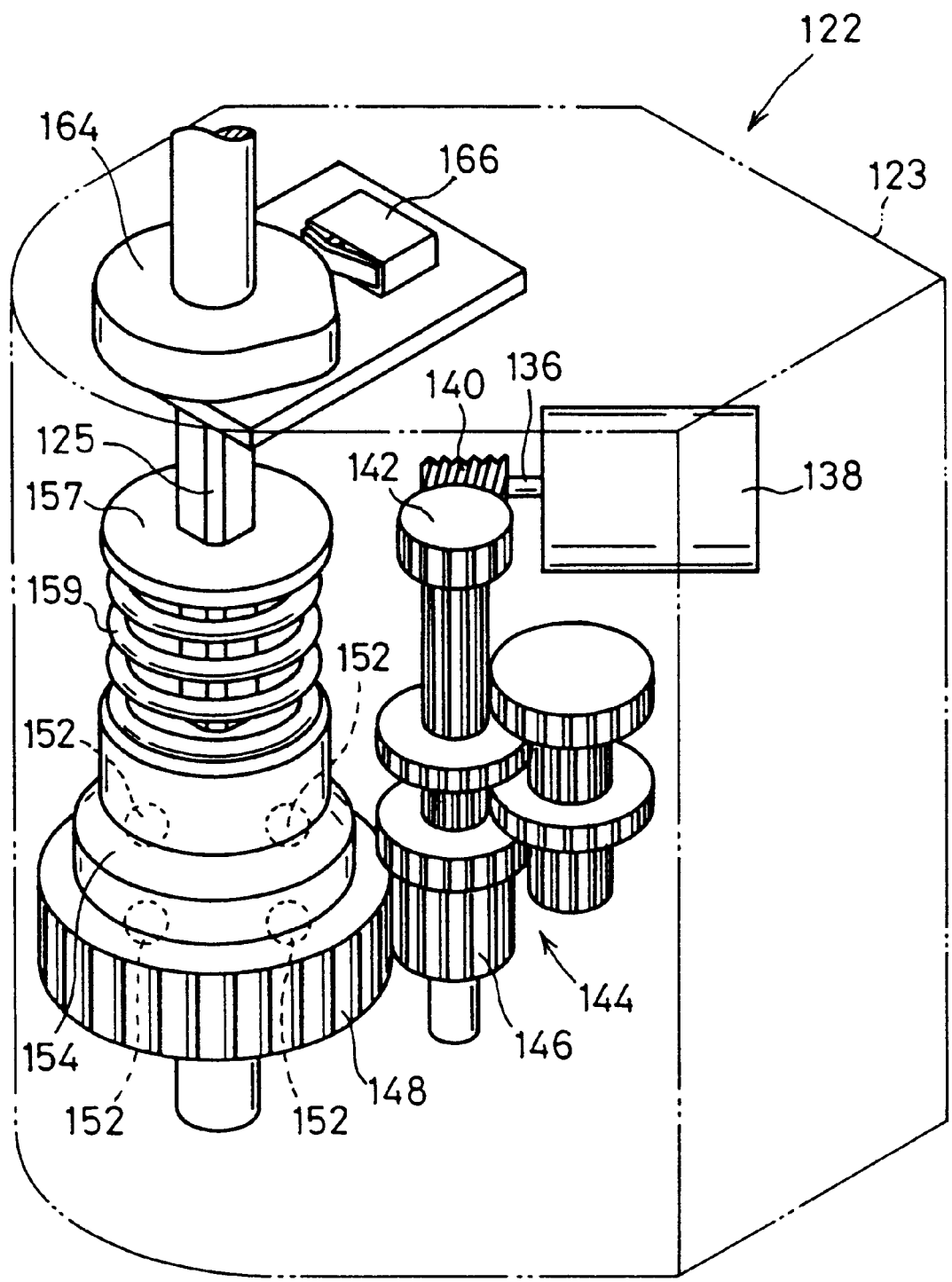
FIG. 12 is a perspective view of a charging lid opening and closing device.
Figure 13:
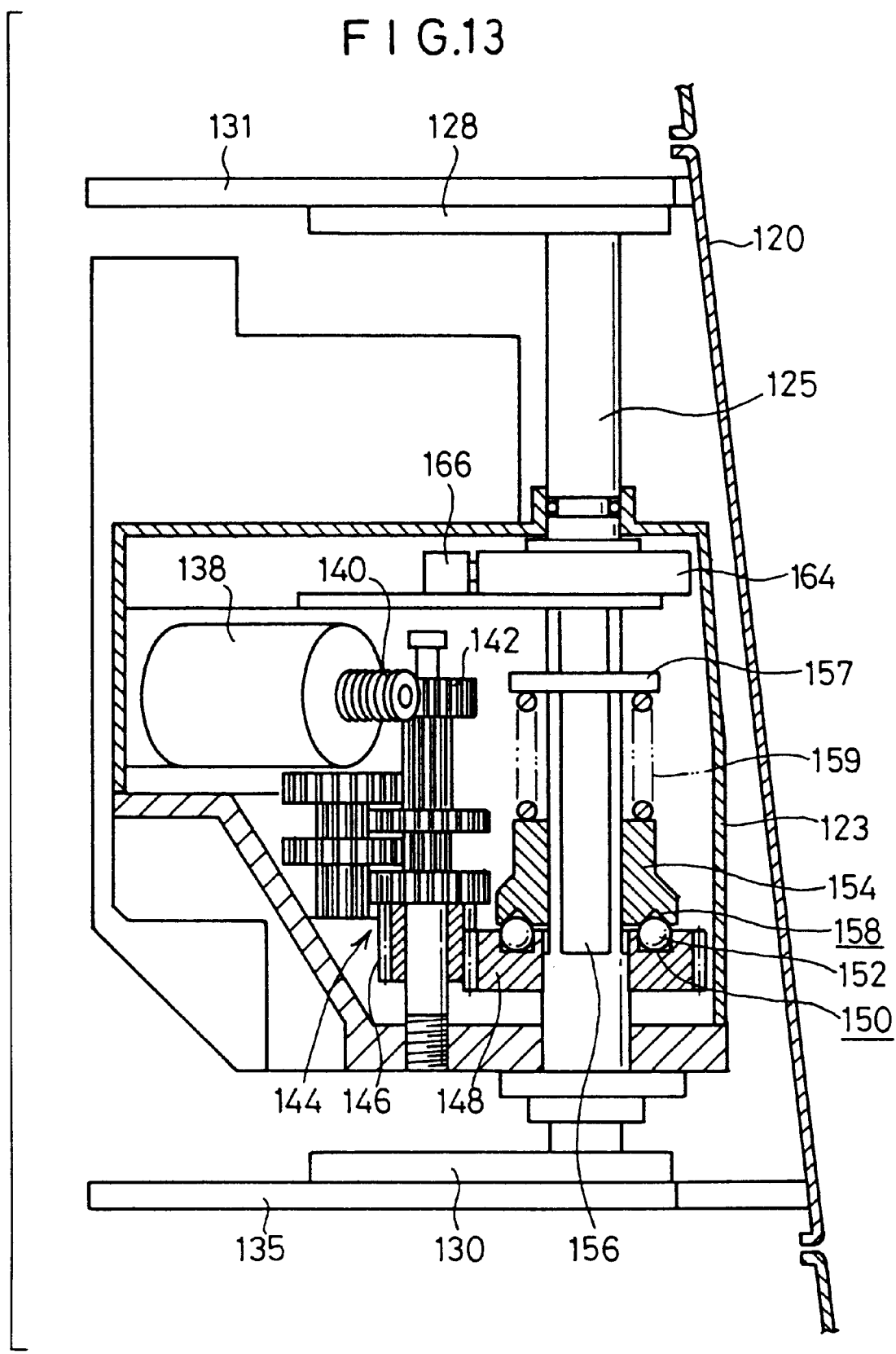
FIG. 13 is a cross-sectional view of the charging lid opening and closing device.

The charging lid opening and closing device 122 is constructed as shown in FIGS. 12 and 13. The charging lid opening and closing device 122 has a casing 123 surrounding its components, and a rotatable shaft 125 having opposite ends projecting out of the casing 123. Stays 131, 135 connected to the charging lid 120 by brackets 128, 130 are joined to the respective opposite ends of the rotatable shaft 125.

The casing 123 houses therein an electric motor 138 which rotates a drive shaft 136 based on a command signal for opening and closing the charging lid 120 which is supplied from the vehicle control ECU 100. A worm 140 mounted on the drive shaft 136 is held in mesh with a worm wheel 142 to which there is coupled a gear train 144 as a speed reducer comprising a plurality of intermeshing gears having different diameters. The gear train 144 has a final gear 146 held in mesh with outer gear teeth of a base plate 148.

The rotatable shaft 125 connected to the charging lid 120 is rotatably inserted centrally through the base plate 148. The base plate 148 has a plurality of grooves 150 defined in one surface thereof around the central axis of the base plate 148, with balls 152 engaging in the respective grooves 150. A slide collar 154 is fitted over the rotatable shaft 125 in axially confronting relation to the base plate 148. The slide collar 154 engages an engagement surface 156 of the rotatable shaft 125 and is displaceable in the axial direction of the rotatable shaft 125. A collar 157 is fixedly mounted on the rotatable shaft 125 in axially spaced relation to the slide collar 154. A helical spring 159 is disposed around the rotatable shaft 125 between the collar 157 and the slide collar 154 for normally biasing the slide collar 154 away from the collar 157. The slide collar 154 has a plurality of engagement recesses 158 defined in a surface thereof facing the base plate 148, the engagement recesses 158 being positioned in regions corresponding to the grooves 150 and regions between the grooves 150. The balls 152 are engageable in the engagement recesses 158. Each of the engagement recesses 158 is of a conical shape for allowing one of the balls 152 to engage therein and disengage therefrom.

A dog 164 is fixedly mounted on the rotatable shaft 125. A charging lid opening and closing sensor 166 is housed in and fixed to the casing 123 for detecting an angular displacement of the dog 164 caused by the rotatable shaft 125.

The electric vehicle 10, the battery charging apparatus 26, and the charging lid opening and closing device 122 are basically constructed as described above. Operation of the electric vehicle 10, the battery charging apparatus 26, and the charging lid opening and closing device 122 will be described below.

First, a process for renting an electric vehicle 10 in the electric vehicle sharing system will briefly be described below with reference to FIGS. 1 and 2.

A user checks ID information based on an IC card, for example, with the port terminal control unit 20 at the platform 18 of any arbitrary port 13, and selects an electric vehicle 10. The selected electric vehicle 10 is automatically driven to the platform 18 by being guided by the induction cable 22 and the magnetic nails 24 in the parking area 19.

As shown in FIG. 10, the electric vehicle 10 has the sensors 112, 114 that are symmetrically positioned along the rear wheel axle. The vehicle control ECU 100 controls the steering controller 110 in order to equalize the intensities, detected by the sensors 112, 114, of a magnetic field that is generated by a current flowing through the induction cable 22, for thereby guiding the electric vehicle 10 along the induction cable 22 to the platform 18. Based on the intensities of magnetic fields generated by the magnetic nails 24 detected by the sensor 116, the vehicle control ECU 100 detects the position of the electric vehicle 10 in the direction of travel. When the electric vehicle 10 arrives at the platform 18, the vehicle control ECU 100 controls the brake controller 108 to stop the electric vehicle 10.

When the electric vehicle 10 arrives at the platform 18, the automatic driving mode of the electric vehicle 10 is canceled. Thereafter, the user gets on the electric vehicle 10 and manually drives the electric vehicle 10 to a destination.

A process for returning the electric vehicle 10 and putting the electric vehicle 10 on standby in a parking area 19 will be described below with reference to FIG. 14.

The user gets off the electric vehicle 10 at the platform 18 of any arbitrary port 13, and then operates the port terminal control unit 20 to return the electric vehicle 10 in step S1. When the returning procedure is completed by the user, the electric vehicle 10 is automatically driven to a position (charging port) where the battery charging apparatus 26 is located in the parking area 19 in step S2. At this time, the electric vehicle 10 is controlled using the induction cable 22 and the magnetic nails 24 in the parking area 19, in the same manner as when the electric vehicle 10 is rented.

As shown FIG. 3, the charging port has the battery charging apparatus 26 and the tire tread force sensor 44 for detecting the position of the electric vehicle 10. The tire tread force sensor 44 detects whether the receiving coupler 118 of the electric vehicle 10 is positioned within predetermined ranges along the X- and Z-axes with respect to the battery charging apparatus 26, in step S3.

Based on a detected signal from the battery charging apparatus 26, the charging robot controller 99 decides whether the electric vehicle 10 is in a fitting position where the feeding coupler 40 of the battery charging apparatus 26 can be fitted in the receiving coupler 118 of the electric vehicle 10 in step S4. If the electric vehicle 10 is not in the fitting position, then the position where the electric vehicle 10 is stopped with respect to the charging port is adjusted in step S5. Thereafter, the processing in steps S3, S4 is repeated.

Figure 15:
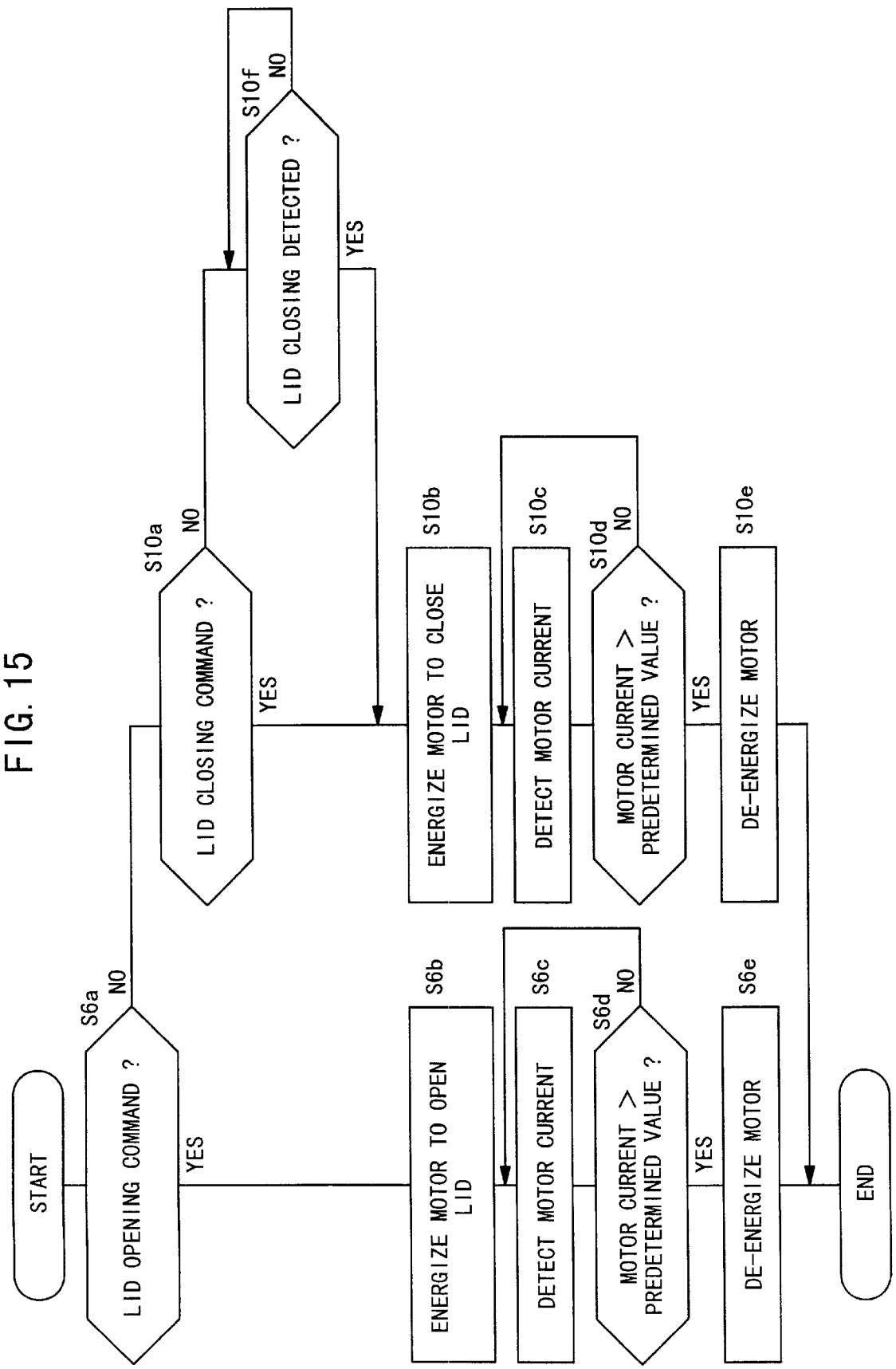
FIG. 15 is a flowchart of a processing sequence of a control process for opening and closing the charging lid.

If the electric vehicle 10 is in the fitting position in step S4, then the charging lid 120 of the electric vehicle 10 is automatically opened in step S6. A control process for opening and closing the charging lid 120 will be described below with reference to FIG. 15.

When the vehicle control ECU 100 receives a lid opening command signal from the battery charging apparatus 26 in step S6a, the vehicle control ECU 100 energizes the motor 138 of the charging lid opening and closing device 122 to rotate its drive shaft 136 in a direction to open the charging lid 120 in step S6b.

Specifically, the worm 140 coupled to the drive shaft 136 is rotated to cause the gear train 144, which serves as the speed reducer including the worm wheel 142 meshing with the worm 140, to rotate the base plate 148. The slide collar 154 is coaxially connected to the base plate 148 by the balls 152. As the slide collar 154 is rotated, the rotatable shaft 125 is rotated. The charging lid 120 which is connected to the rotatable shaft 125 by the brackets 128, 130 and the stays 131, 135 is opened.

The vehicle control ECU 100 detects a drive current of the motor 138 in step S6c. If the detected drive current is greater than a predetermined value in step S6d, i.e., if the motor 138 is subjected to a load greater than a predetermined load, then the vehicle control ECU 100 determines that the charging lid 120 is fully opened, and de-energizes the motor 138 in step S6e.

Figure 14:
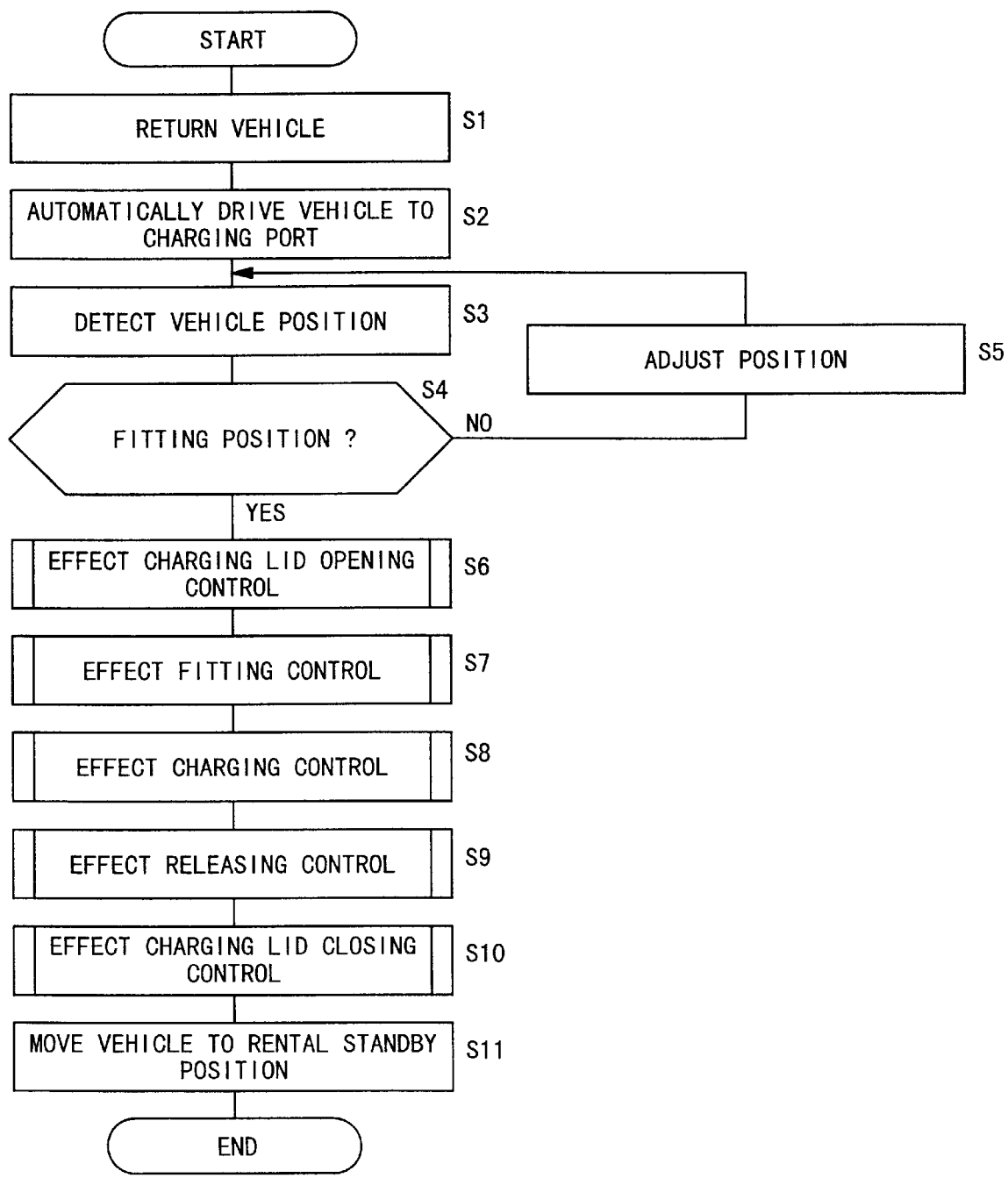
FIG. 14 is a flowchart of a processing sequence from the return of an electric vehicle to the completion of battery charging.
Figure 16:
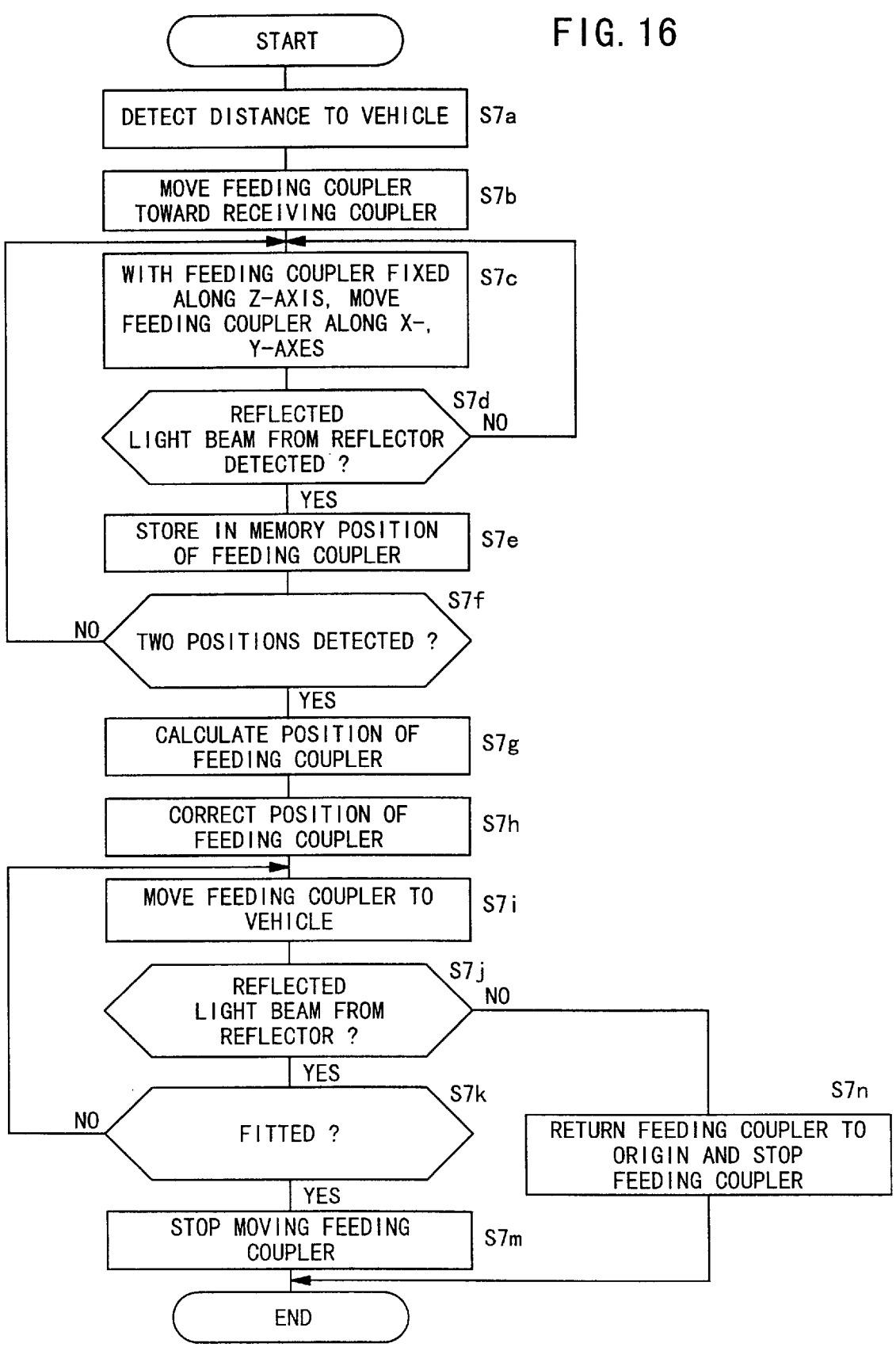
FIG. 16 is a flowchart of a processing sequence of a process for fitting the feeding coupler, which is carried out by the battery charging robot.

After the charging lid 120 is opened, the battery charging robot 30 of the battery charging apparatus 26 is actuated to bring the feeding coupler 40 into fitting engagement with the receiving coupler 118 of the electric vehicle in step S7 (see FIG. 14). A control process for fitting the feeding coupler 40 with the receiving coupler 118 will be described below with reference to FIG. 16. The ultrasonic sensor 42 on the base 32 of the battery charging robot 30 detects a distance from the battery charging robot 30 to the receiving coupler 118 in step S7a. Based on the detected distance to the receiving coupler 118, the battery charging robot 30 actuates the first arm 36 and the second arm 38 to move the feeding coupler 40 along the Z-axis toward the receiving coupler 118 in step S7b. Then, the battery charging robot 30 holds the feeding coupler 40 in its position along the Z-axis, and moves the feeding coupler 40 along the X- and Y-axes in step S7c. The battery charging robot 30 detects reflected light beams from the reflectors 132, 133 on the receiving coupler 138 in step S7d.

Specifically, the light-emitting element 96 on the feeding coupler 40 emits a light beam toward the receiving coupler 118, and the battery charging robot 30 detects a position where a reflected light beam from the reflector 132 on the receiving coupler 118 can be detected by the light-detecting element 96. The battery charging robot 30 stores in memory the position of the feeding coupler 40 when the reflected light beam from the reflector 132 is detected by the light-detecting element 96 in step S7e.

Similarly, the battery charging robot 30 detects a position where a reflected light beam from the reflector 133 on the receiving coupler 118 can be detected by the light-detecting element 96. The battery charging robot 30 stores in memory the position of the feeding coupler 40 when the reflected light beam from the reflector 133 is detected by the light-detecting element 96 in steps S7c through S7f.

From the two positions of the feeding coupler 40 where the reflected beams are detected, the battery charging robot 30 calculates the position of the receiving coupler 118 in step S7g. Since the receiving coupler 118 is thus positionally detected, the feeding coupler 40 can be fitted in the receiving coupler 118 with high accuracy.

Based on the position of the receiving coupler 118 calculated in step S7g, the battery charging robot 30 displaces the feeding coupler 40 along the X- and Y-axes to correct the position of the feeding coupler 40 in step S7h. Thereafter, the battery charging robot 30 actuates the first arm 36 and the second arm 38 to move the feeding coupler 40 toward the receiving coupler 118 of the electric vehicle 10 in step S7i.

The battery charging apparatus 26 monitors whether there is a reflected light beam from the reflector 132 of the receiving coupler 118 or not at all times in step S7j. The battery charging robot 30 continuously moves the feeding coupler 40 until there is a reflected light beam from the reflector 132 and the feeding coupler 40 is brought into fitting engagement with the receiving coupler 118 in step S7k.

Figure 5:
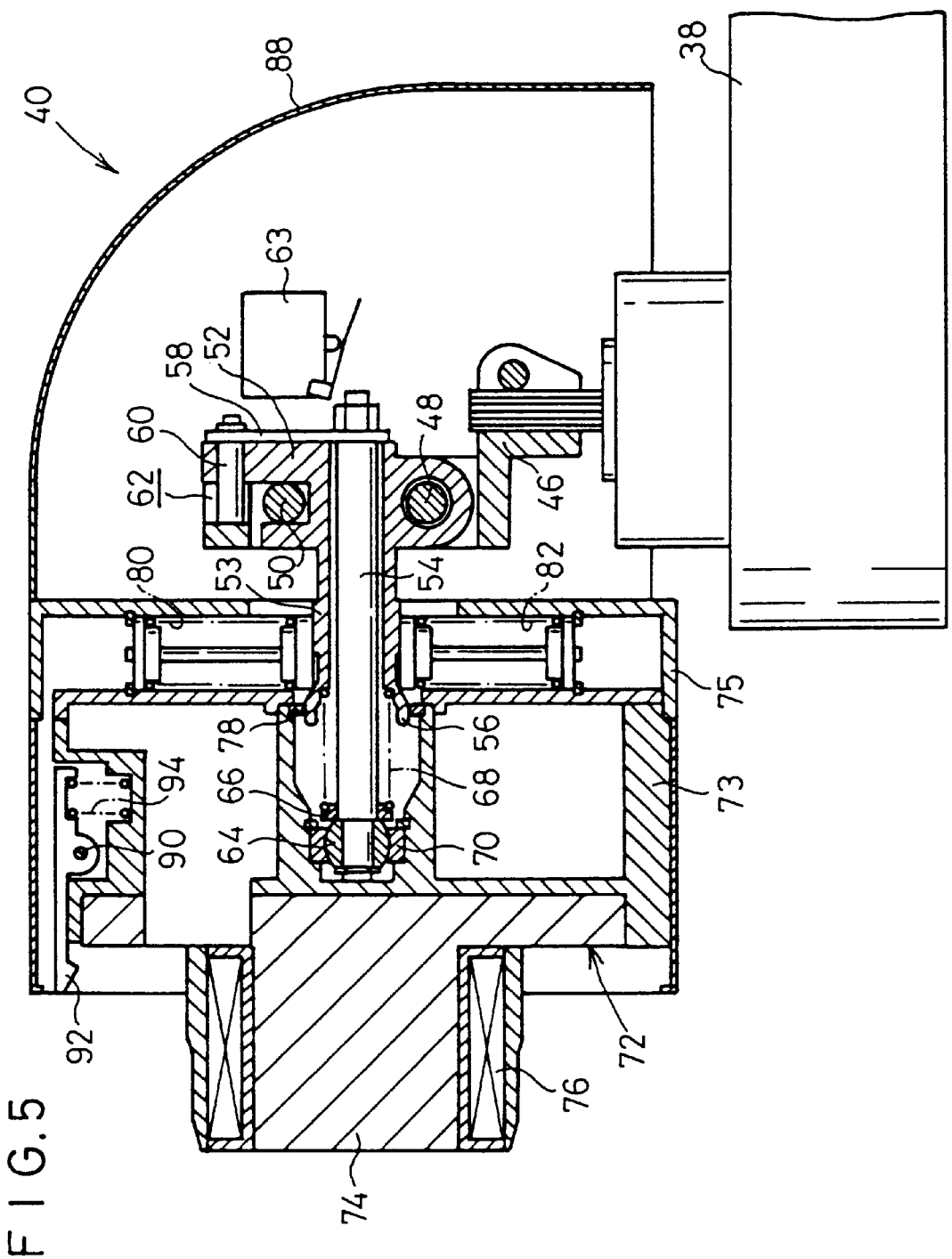
FIG. 5 is a cross-sectional view of a feeding coupler of a battery charging robot.

The feeding coupler 40 is fitted into the receiving coupler 118 as follows:

In FIG. 5, when the feeding coupler 40 is moved toward the receiving coupler 118 and the tip end of the feeding coupler 40 near the core 74 is pressed by the tip end of the receiving coupler 118 near the core 124, the coupler body 72 of the feeding coupler 40 is displaced together with the shaft 54 toward the first bracket 46. The stop ring 78 in the coupler body 72 is disengaged from the skirt 56, and the stop pin 60 is brought out of the hole 62 and hence is disengaged from the first bracket 46. As a result, the coupler body 72 becomes angularly movable about the ball 64 on the shaft 54, and is slightly displaceable along the X-axis in the longitudinal direction of the electric vehicle 10.

Figure 6:
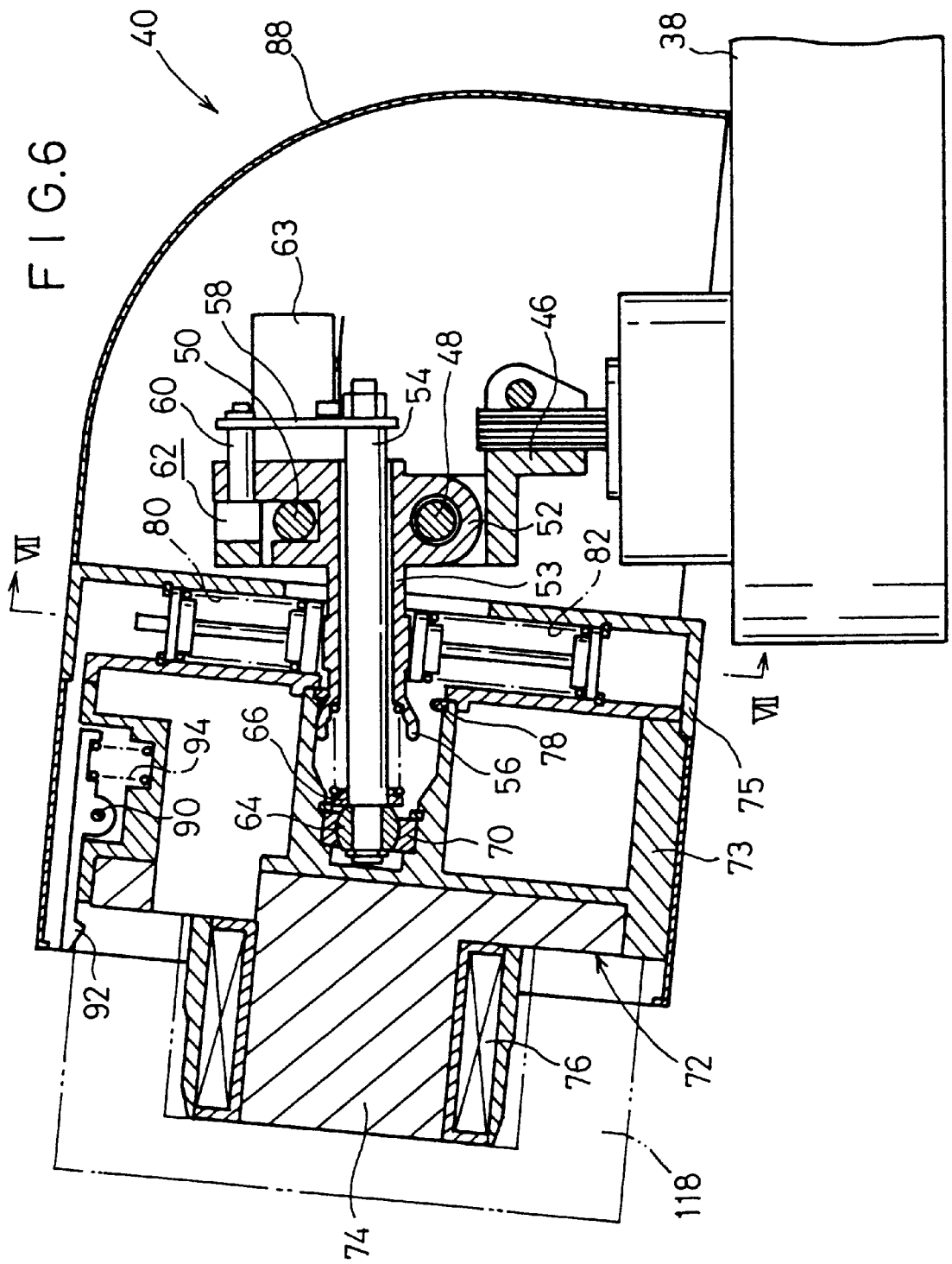
FIG. 6 is a cross-sectional view of the feeding coupler which has been angularly moved.
Figure 7:
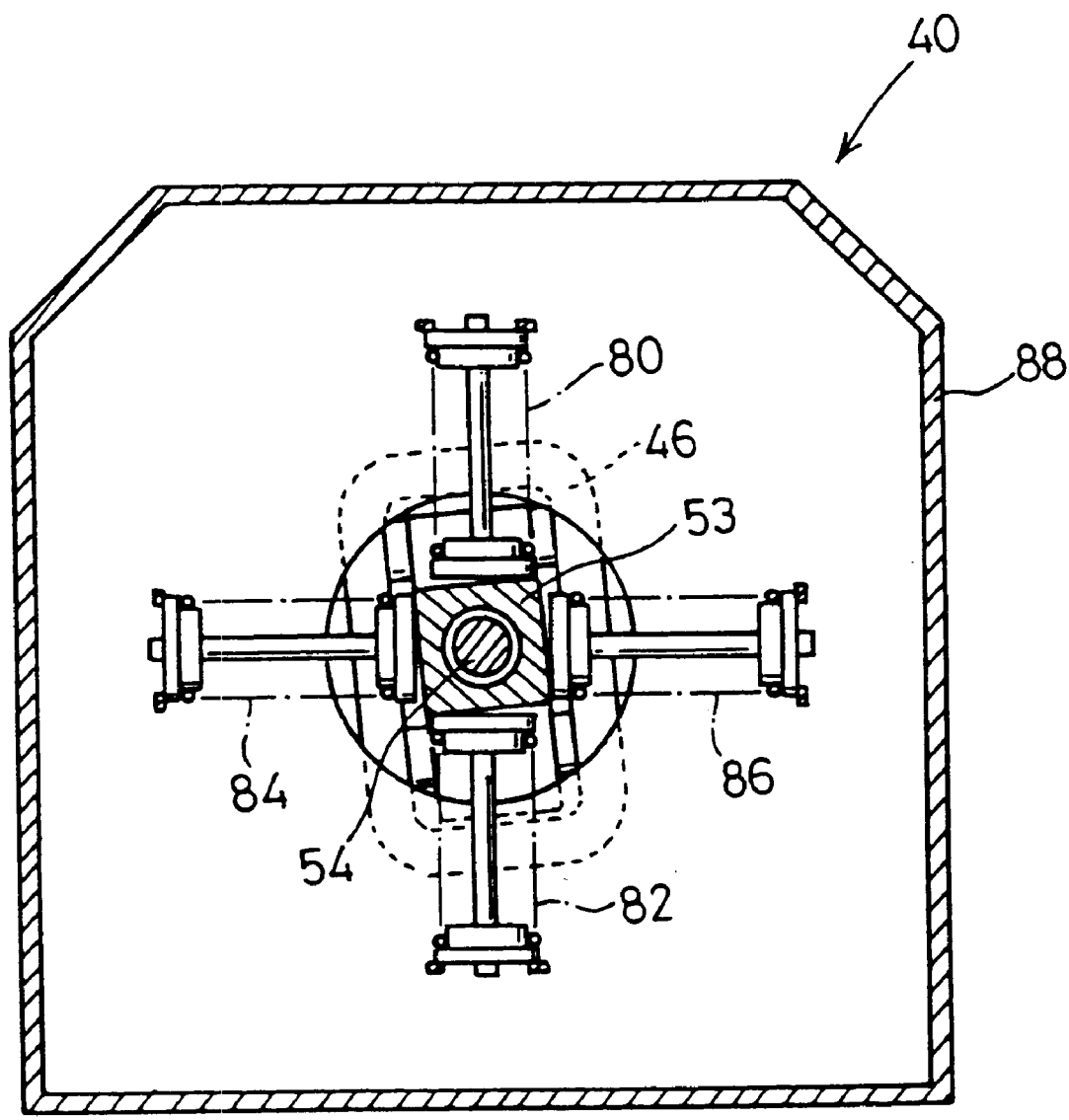
FIG. 7 is a cross-sectional view taken along line VII–VII of FIG. 6.
Figure 8:
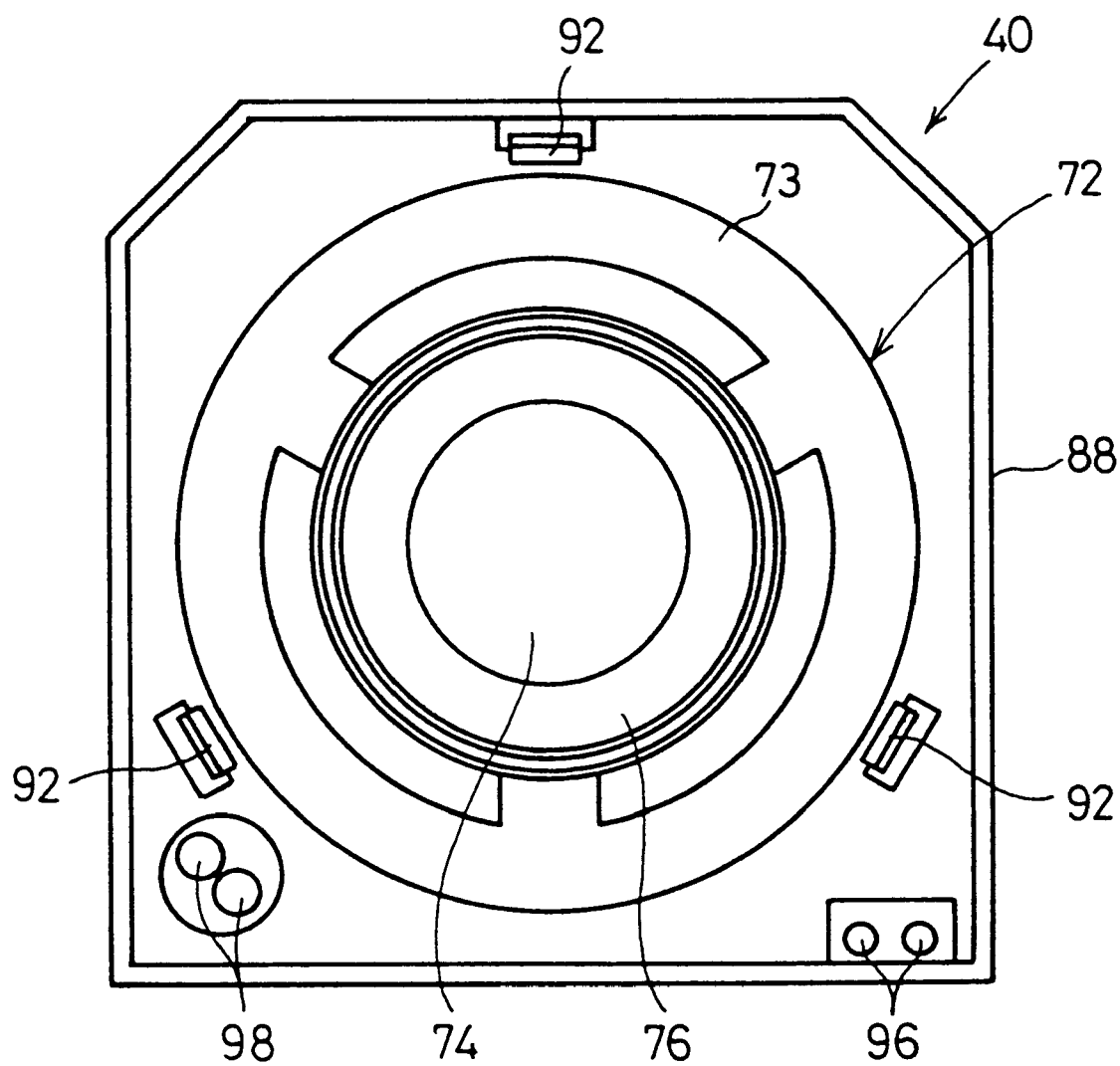
FIG. 8 is a front elevational view of the feeding coupler shown in FIG. 5.

Consequently, even if there is a small positional misalignment between the feeding coupler 40 and the receiving coupler 118 when the feeding coupler 40 is pressed by the receiving coupler 118, the feeding coupler 40 can be smoothly guided into the receiving coupler 118 (see FIGS. 6 and 7). Since the feeding coupler 40 is fixed in position until it is fitted into the receiving coupler 118, the feeding coupler 40 is prevented from swinging while it is being moved toward the receiving coupler 118. Thus, the feeding coupler 40 is prevented from taking an inappropriate attitude immediately before it engages the receiving coupler 118, and hence can well be fitted into the receiving coupler 118.

After the feeding coupler 40 is fitted into the receiving coupler 118, when the feeding coupler 40 is further displaced toward the receiving coupler 118, the end of the shaft 54 engages the limit switch 63, which detects the full fitting engagement of the feeding coupler 40 with the receiving coupler 118.

Upon detection of the full fitting engagement of the feeding coupler 40 with the receiving coupler 118, the battery charging apparatus 26 stops the movement of the feeding coupler 40 in step S7m. The fitting engagement of the feeding coupler 40 with the receiving coupler 118 is now completed.

If a reflected light beam from the reflector 132 is not detected in step S7j, then the battery charging apparatus 26 determines that an unexpected situation has occurred, e.g., a foreign object has entered between the feeding coupler 40 and the receiving coupler 118, blocking the reflected light beam, or the charging lid 120 is accidentally closed. The battery charging apparatus 26 returns the feeding coupler 40 to its origin, i.e., the standby position, and stops moving the feeding coupler 40 in step S7n.

If a reflected light beam from the reflector 132 is not detected, then the battery charging apparatus 26 may not return the feeding coupler 40 to its origin and stop moving the feeding coupler 40. Rather, the battery charging apparatus 26 may stop moving the feeding coupler 40 and then start coupling the feeding coupler 40 to the receiving coupler 118 again, or may return the feeding coupler 40 to its origin and then start coupling the feeding coupler 40 to the receiving coupler 118 again.

Figure 17:
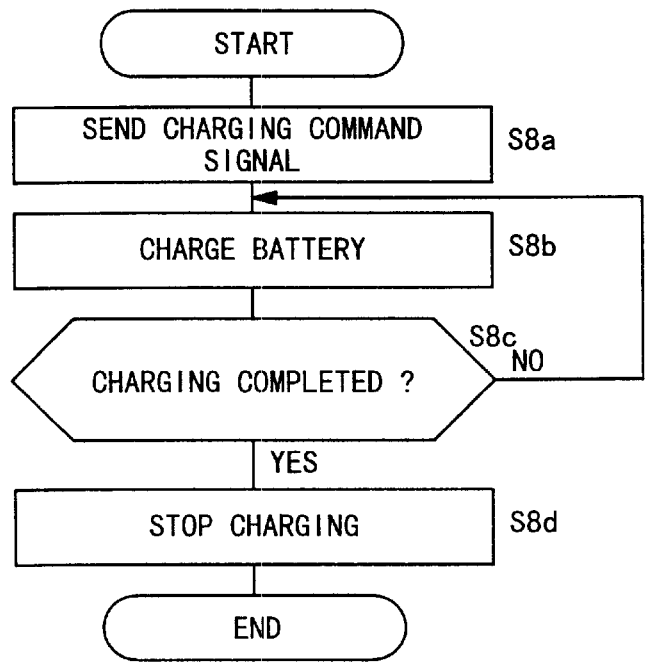
FIG. 17 is a flowchart of a processing sequence of a battery charging process carried out by the battery charging robot.

If the feeding coupler 40 is properly fitted into the receiving coupler 118, then a battery charging process is carried out by the battery charging robot in step S8 (FIG. 14). The battery charging process will be described below with reference to FIG. 17.

The vehicle control ECU 100 checks a charged state of the battery 102. If the vehicle control ECU 100 determines that the battery 102 needs to be charged, then the vehicle control ECU 100 sends a charging command signal from the light-emitting element 134 on the receiving coupler 118 to the light-emitting element 98 on the feeding coupler 40 in step S8a. In response to the charging command signal, the battery charging apparatus 26 supplies a current to the feeding coil 76 of the feeding coupler 40. The current supplied to the feeding coil 76 generates a magnetic field which generates a current in the receiving coil 126 of the receiving coupler 118. The generated current is rectified by the rectifier 127 into a direct current, which is supplied via the contactor 129 made conductive by the vehicle control ECU 100 to the battery 102 for thereby charging the battery 102 in step S8b.

Inasmuch as the feeding coupler 40 is slightly displaceable along the X-axis with respect to the receiving coupler 118 and is also angularly movable, the feeding coupler 40 does not damage the receiving coupler 118 even if the electric vehicle 10 is positionally displaced while the battery 102 is being charged. Accordingly, the battery 102 can continuously be charged under good conditions.

The vehicle control ECU 100 checks the charged state of the battery 102 at all times. If the vehicle control ECU 100 determines that the battery 102 is fully charged, the vehicle control ECU 100 sends a charging completion signal via the light-emitting element 134 to the battery charging apparatus 26, and turns off the contactor 129 in step S8c. In response to the charging completion signal, the battery charging apparatus 26 stops supplying the current to the feeding coil 76, and the charging of the battery 102 is completed in step S8d.

Figure 18:
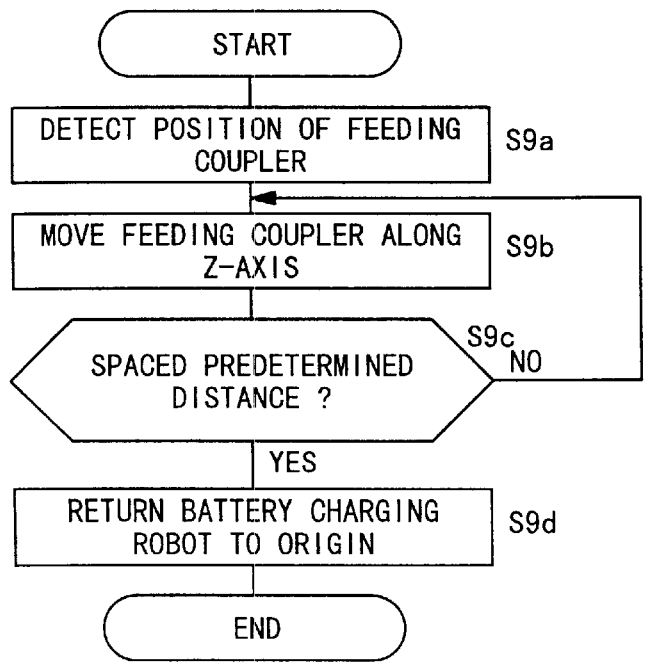
FIG. 18 is a flowchart of a processing sequence of a process for releasing the feeding coupler, which is carried out by the battery charging robot.

After the charging of the battery 102 is completed, the battery charging robot 30 releases the feeding coupler 40 from the receiving coupler 118 in step S9 (see FIG. 14). A process for releasing the feeding coupler 40 from the receiving coupler 118 will be described below with reference to FIG. 18.

The battery charging apparatus 26 detects the position of the feeding coupler 40 along the X- and Y-axes based on signals from sensors (not shown) attached to the robot body 34, the first arm 36, and the second arm 38 of the battery charging robot 30 in step S9a. While keeping the detected position of the feeding coupler 40 along the X- and Y-axes, the battery charging apparatus 26 actuates the first arm 36 and the second arm 38 to move the feeding coupler 40 along the Z-axis in step S9b. In this manner, the feeding coupler 40 can be released from the receiving coupler 118 without causing damage to the receiving coupler 118. When the feeding coupler 40 is spaced from the receiving coupler 118, the stop ring 78 engages the skirt 56 of the sleeve 53 under the bias of the spring 68, and is fixed in position again. After the feeding coupler 40 is detected as being spaced a predetermined distance from the receiving coupler 118 in step S9c, the battery charging apparatus 26 moves the robot body 34, the first arm 36, and the second arm 38 to origins along the X-, Y-, and Z-axes for thereby returning the battery charging robot 30 to its origin in step S9d.

Thereafter, a process for closing the charging lid 120 is carried out in step S10 (see FIG. 14). The process for closing the charging lid 120 will be described below with reference to FIG. 15.

If the feeding coupler 40 is sufficiently spaced from the electric vehicle 10 and the vehicle control ECU 100 supplies a lid closing command signal for opening the charging lid 120 in step S10a, then the vehicle control ECU 100 energizes the motor 138 of the charging lid opening and closing device 122 to rotate its drive shaft 136 in a direction to close the charging lid 120 in step S10b.

Specifically, the worm 140 coupled to the drive shaft 136 is rotated to cause the gear train 144 to rotate the base plate 148. The rotation of the base plate 148 causes the balls 152 to rotate the slide collar 154, thus rotating the rotatable shaft 125. The charging lid 120 is now closed.

The vehicle control ECU 100 detects a drive current of the motor 138 in step S10c. If the detected drive current is greater than a predetermined value in step S10d, then the vehicle control ECU 100 determines that the charging lid 120 is fully closed, and de-energizes the motor 138 in step S10e.

The charging lid 120 which is open can manually be closed forcibly. Specifically, when the user, for example, of the electric vehicle 10 displaces the charging lid 120 in a direction to close the same, applying a force greater than a given level to the rotatable shaft 125, the slide collar 154 is displaced along the rotatable shaft 125 against the bias of the spring 159, whereupon the balls 152 are released from the engagement recesses 158. Therefore, whereas the base plate 148 is held against rotation, the rotatable shaft 125 and the slide collar 154 are rotated thereby to displace the charging lid 120 in the closing direction.

When the charging lid 120 is angularly moved a certain angle in the closing direction, the dog 164 rotating with the rotatable shaft 125 is detected by the charging lid opening and closing sensor 166, which enables the vehicle control ECU 100 to recognize that the charging lid 120 is being closed in step S10f. The vehicle control ECU 100 now energizes the motor 138 to rotate its drive shaft 136 in the direction to close the charging lid 120 in step S10b. When the base plate 148 is angularly moved a certain angle, the balls 152 engage back into the engagement recesses 158, thus coupling the base plate 148 and the slide collar 154 to each other. Therefore, the charging lid 120 is forcibly displaced in the closing direction by the motor 138.

The vehicle control ECU 100 detects a drive current of the motor 138 in step S10c. If the detected drive current is greater than a predetermined value in step S10d, then the vehicle control ECU 100 determines that the charging lid 120 is fully closed, and de-energizes the motor 138 in step S10e.

The electric vehicle 10 with the charging lid 120 closed is then moved to a rental standby position in the parking area 19 in step S11.

Although a certain preferred embodiment of the present invention has been shown and described in detail, it should be understood that various changes and modifications may be made therein without departing from the scope of the appended claims.

What is claimed is:

1. A battery charging apparatus for supplying electric energy to the battery of a battery-powered electric vehicle through a receiving coupler mounted on the electric vehicle, comprising:

a feeding coupler for being brought into fitting engagement with the receiving coupler;

a displacing mechanism for displacing said feeding coupler toward said receiving coupler;

a fixing mechanism for fixing said feeding coupler to said displacing mechanism, and releasing said feeding coupler from said displacing mechanism when said feeding coupler is pressed against said receiving coupler; and a support mechanism for supporting said feeding coupler displaceably with respect to said displacing mechanism when said feeding coupler is released from said displacing mechanism.

2. A battery charging apparatus according to claim 1, wherein said fixing mechanism comprises:

first engaging means for engaging said feeding coupler with said displacing mechanism for preventing said feeding coupler from being displaced along the electric vehicle; and second engaging means for engaging said feeding coupler with said displacing mechanism for preventing said feeding coupler from being angularly moved with respect to said displacing mechanism;

the arrangement being such that when said feeding coupler is pressed by said receiving coupler, said first engaging means and said second engaging means disengage said feeding coupler from said displacing mechanism.

3. A battery charging apparatus according to claim 2, further comprising a resilient member for biasing said feeding coupler to project toward the electric vehicle, said first engaging means comprising a pin for disengaging said feeding coupler from said displacing mechanism upon displacement of said feeding coupler in response to compression of said resilient member when said feeding coupler is pressed by said receiving coupler.

4. A battery charging apparatus according to claim 2, further comprising a resilient member for biasing said feeding coupler to project toward the electric vehicle, said second engaging means comprising a stop ring for disengaging said feeding coupler from said displacing mechanism upon displacement of said feeding coupler in response to compression of said resilient member when said feeding coupler is pressed by said receiving coupler.

5. A battery charging apparatus according to claim 1, wherein said support mechanism comprises a ball joint by which said feeding coupler is supported angularly movably with respect to said displacing mechanism, and a plurality of resilient members for supporting said feeding coupler in a constant attitude with respect to said displacing mechanism.

6. A battery charging apparatus according to claim 1, wherein said displacing mechanism comprises detecting means for detecting when said feeding coupler is displaced toward said displacing mechanism, and means for detecting when said feeding coupler is brought into fitting engagement with the receiving coupler based on a detected signal from said detecting means.

* * * * *